United States Patent [19]

Schorr

[11] 4,160,945
[45] Jul. 10, 1979

[54] HIGH EFFICIENCY SWITCHING REGULATOR

[75] Inventor: Ian A. Schorr, Chicago, Ill.

[73] Assignee: Wescom, Inc., Downers Grove, Ill.

[21] Appl. No.: 833,765

[22] Filed: Sep. 16, 1977

[51] Int. Cl.² ............................................... G05F 1/56
[52] U.S. Cl. ............................... 323/17; 323/DIG. 1; 361/19
[58] Field of Search ...................... 323/17, 20, DIG. 1, 323/22 T; 363/41, 16, 28, 19; 307/296, 297, 265

[56] References Cited

U.S. PATENT DOCUMENTS

| | | | |
|---|---|---|---|
| 3,577,059 | 5/1971 | Kelley, Jr. ............................. | 323/20 |
| 3,772,588 | 11/1973 | Kelly et al. .................... | 323/DIG. 1 |
| 4,017,789 | 4/1977 | Morris ................................. | 323/17 |
| 4,030,024 | 6/1977 | Chambers et al. .................... | 323/17 |

FOREIGN PATENT DOCUMENTS 2625036 12/1977 Fed. Rep. of Germany ............. 323/17

OTHER PUBLICATIONS

*Electronics*, Mar. 9, 1962; "Power Supply Uses Switching Preregulation," by Riordon; pp. 62–64.

*Primary Examiner*—Gerald Goldberg
*Attorney, Agent, or Firm*—Leydig, Voit, Osann, Mayer & Holt, Ltd.

[57] ABSTRACT

A switching regulator generates controllable pulses from a primary d-c. voltage source and then smooths the pulses to form a d-c. output that varies according to the changes in the pulses. A reference voltage source establishes a d-c. reference signal that varies in magnitude with any variations in the magnitude of the d-c. output but with a substantially constant differential in magnitude between the reference signal and the d-c. output. A voltage or current sensor generates a signal that varies in accordance with changes in the voltage or current level of the d-c. output, and a comparator detects the difference between the reference signal and the signal from the sensing means to produce a control signal that varies according to changes in the difference between the two signals. The pulses that form the d-c. output are adjusted in response to the control signal to maintain the output at a regulated voltage or current level. An auxiliary internal power supply is provided for the reference voltage source and the comparator and the current flow is returned through the reference voltage source and the comparator to the auxiliary internal power supply to minimize power losses in the reference voltage source and the comparator. A predetermined d-c. dry voltage is superimposed on the d-c. voltage from the primary source and floats with respect to the reference signal and the d-c. output.

15 Claims, 4 Drawing Figures

HIGH EFFICIENCY SWITCHING REGULATOR

DESCRIPTION OF THE INVENTION

The present invention relates generally to switching regulators and, more particularly, to switching regulators for furnishing regulated d-c. current or voltage outputs.

Switching regulators are used to supply regulated d-c. voltage or current in a variety of different applications. These regulators are generally more efficient than the older types of regulators, but nevertheless there is a need for still higher levels of efficiency to permit large numbers of such regulators, and the circuits they supply, to be accommodated in a relatively small space. For example, in telephone transmission lines it would be desirable to mount a large number of office repeaters in a single bay, without exceeding the limit on the allowable power dissipation in the bay. Since the largest power loss is normally in the power regulators for the transmission line repeaters, the number of office repeaters that can be accommodated within a single bay is limited primarily by the amount of power dissipated in the regulators. Consequently, it is important to keep the power losses within the regulators as low as possible, without any sacrifice in the precision or stability of the regulation. Furthermore, because of the high density of intricate circuits in such systems, it is also important that the regulators operate in such a manner that they do not generate high frequency signals which might interfere with the operation of adjacent or nearby circuits.

The switching regulators that are commercially available today are much more efficient than conventional series or shunt regulators, but they still do not offer efficiencies better than 60–70% in their low power, high input-high output voltage level end. There are several sources of inefficiency in these regulators, the main ones being power wasted by driving a switching transistor, d-c. losses in the switching transistor, and switching losses caused by operation of the switching transistor in the linear region. For a typical saturated switching transistor the driving losses reach as much as 20% of the total power delivered from the input power source, due to the triangular shape of current flowing through the switch and the rectangular shape of the driving current. Driving losses can be decreased by using a Darlington transistor, but that in turn increases the d-c. losses in the switching transistor by raising its saturation voltage and increases the switching losses by reducing the speed of the switching transistor. Also the Darlington transistor costs much more than more conventional power switching transistors.

A switching regulator with improved efficiency is described in U.S. Pat. No. 4,030,024 to D. Chambers et al., but this regulator provides relatively poor regulation because of the relatively high temperature coefficient of the rectifying diode connected between the main power line and the control circuitry. Moreover, because the internal voltage for the control circuitry floats on the output pulses from the switching transistor in the Chambers regulator, the pedestal for the internal voltage includes a substantial a-c. component which can interfere with nearby circuits. There is also a certain amount of power lost through the zener diode that is used to regulate the internal voltage level in the Chambers regulator.

It is the primary object of the present invention to provide an improved switching regulator that is highly efficient while also producing a precisely regulated d-c. output. In this connection, a particularly important specific object of the invention is to provide such a switching regulator which lowers the losses of the driver for the switching transistor to a negligible value without increasing the d-c. losses in this switch, while simultaneously lowering the switching losses of the transistor switch by increasing its speed.

It is another object of this invention to provide a switching regulator that minimizes power losses in the internal control circuitry while maintaining internal voltage levels that do not vary any more than the d-c. input voltage of the regulator. In this connection, a related object of the invention is to provide a highly efficient switching regulator that does not generate high frequency signals that interfere with other circuits located nearby.

It is a further object of the invention to provide such an improved switching regulator which is substantially insensitive to temperature changes, thereby ensuring stability in the regulated d-c. output.

Still another object of the invention is to provide such an improved switching regulator which is economical to both manufacture and operate.

Other objects and advantages of the invention will be apparent from the following detailed description and the accompanying drawings, in which.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention as defined by the appended claims.

Figure 1:
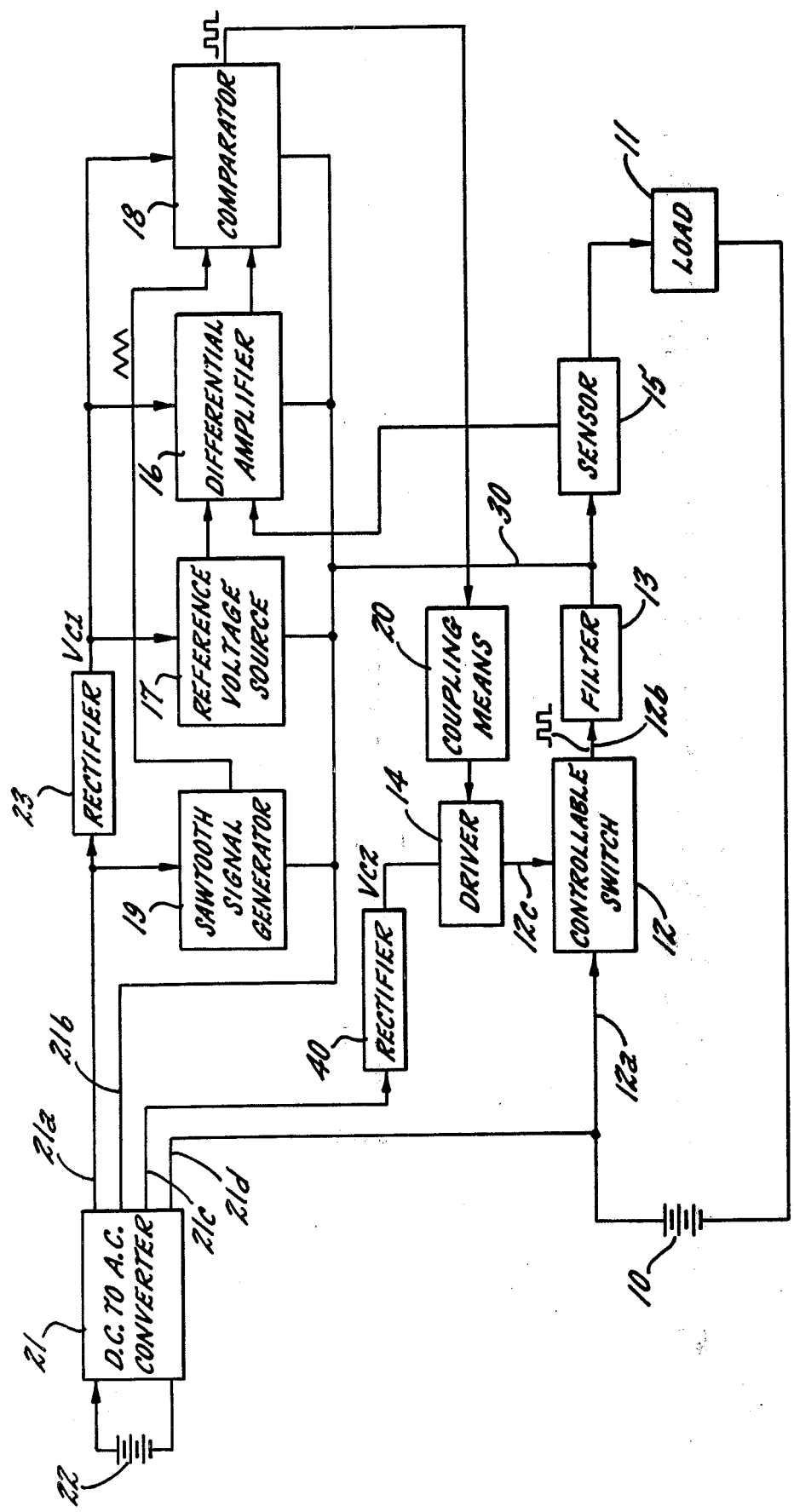
FIG. 1 is a block diagram of a pulse width modulated switching regulator embodying the invention.

Turning now to the drawings and referring first to FIG. 1, there is illustrated a switching regulator for furnishing d-c. power from a d-c. voltage source 10 to a load 11 at a regulated current level. The illustrative system is particularly useful for supplying power to an array of office repeaters in a high density office repeater bay. Thus, the d-c. voltage source 10 may represent a 130-volt office battery. The positive terminal of this battery is connected to the power input 12a of a controllable electronic switch 12, e.g., a power transistor, which is switched on and off to generate a series of pulses at the power output 12b of the switch. These pulses are smoothed by a filter 13 to form a d-c. output that varies according to changes in the width of the pulses generated by the switch 12.

Control of the d-c. output is achieved by modulating the width of drive pulses supplied to the control input 12c of the switch 12 from a driver 14. That is, the pulses generated by the switch 12 are produced at a constant frequency, but the width of the pulses is continuously modulated in accordance with the power drawn by the load 11 to maintain a substantially constant level of current flow to the load. More specifically, when the current drawn by the load 11 decreases, the resulting reduction in current flow through a sensor 15 immediately initiates the generation of a feedback signal for the driver 14 to increase the width of the pulses generated by the switch 12. This increase in the pulse width increases the magnitude of the d-c. output voltage, thereby holding the output current at a substantially constant level. Conversely, when the current drawn by the load 11 increases, the resulting increase in current flow through the sensor 15 initiates the generation of a feedback signal which decreases the width of the pulses generated by the switch 12. This decrease in the pulse width decreases the magnitude of the d-c. output voltage, again maintaining a substantially constant level of output currents. Consequently, the level of current flow through the sensor 15 is maintained essentially constant in spite of variations in the impedance of the load 11 or the input source 10. As the width of the pulses increases, the magnitude of the d-c. output voltage increases; and as the width of the pulses decreases, the magnitude of the d-c. output voltage also decreases.

To generate the requisite feedback signals for controlling the driver 14 and switch 12, an "actual current" signal from the sensor 15, representing the output current flow therethrough, is continuously applied to the inverting input of a differential amplifier 16. The other input signal to this differential amplifier 16 is a "set current" signal derived from a reference voltage source 17 and applied to the non-inverting input of the amplifier 16. Thus, the differential amplifier continuously monitors the "actual current" signal from the sensor 15 and produces a "current error" signal proportional to the difference between the "actual current" signal and the "set current" signal from the reference voltage source 17.

Figure 2:
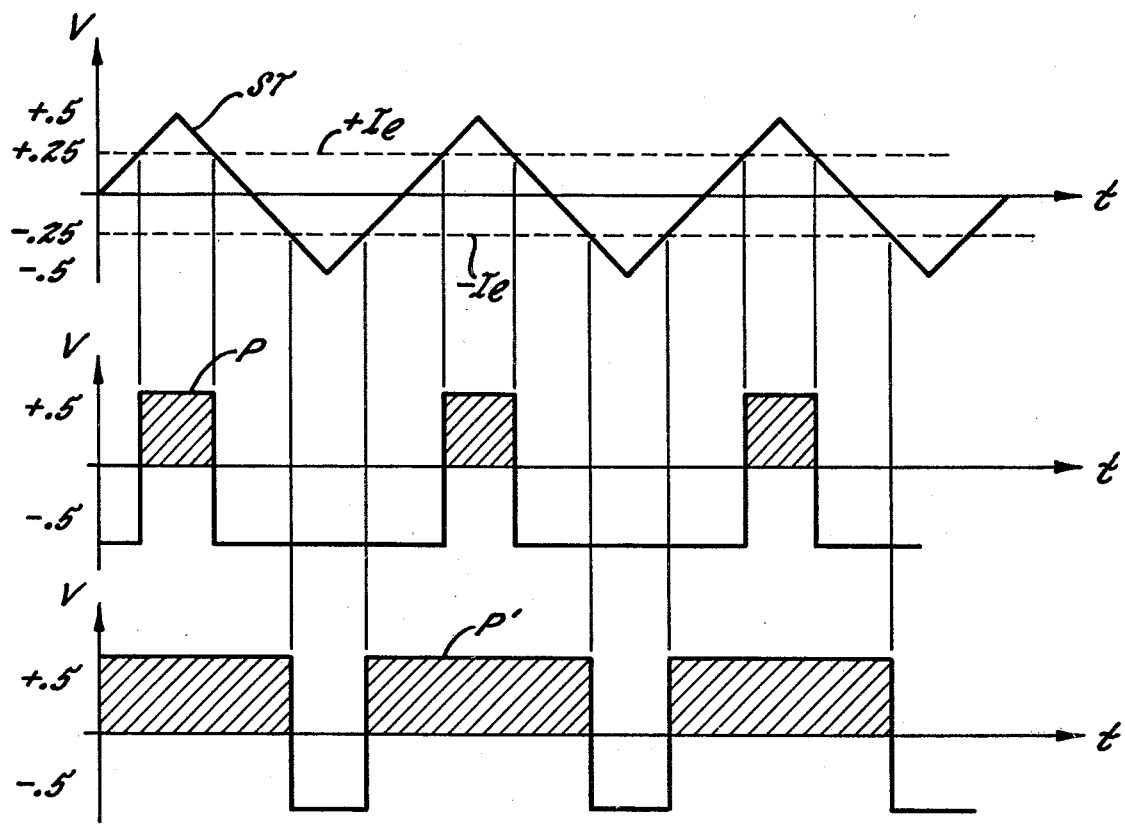
FIG. 2 is a series of waveforms illustrating the operation of certain portions of the regulator shown in FIG. 1.

This "current error" signal from the differential amplifier 16 is applied to the inverting input of a comparator 18 which receives a sawtooth signal at its non-inverting input from a sawtooth signal generator 19. As illustrated in FIG. 2, the magnitude of the "current error" signal $I_e$ from the differential amplifier 16 relative to the sawtooth signal ST determines the width of the output pulses P produced by the comparator 18, causing the width of these output pulses P to be pulse width modulated (PWM) according to the difference between the "actual current" signal from the sensor 15 and the "set current" signal from the reference voltage source 17. Moreover, the polarity of the "current error" signal indicates whether the "actual current" signal is greater or smaller than the "set current" signal.

FIG. 2 illustrates the operation of the comparator 18 in two different situations. In the first situation, the differential amplifier 16 produces a +0.25-volt "current error" signal $+I_e$ in response to an "actual current" signal from the sensor 15 that is above the level of the "set current" signal from the reference voltage source 17. The output of the comparator 18 goes high (+5 volts) only when the sawtooth signal is more positive (or less negative) than the control signal $I_e$, thereby producing relatively narrow positive-going pulses P (shaded in FIG. 2) when the signal $I_e$ is +0.25 volt. In the second situation illustrated in FIG. 2, the differential amplifier 16 produces a −0.25-volt control signal $-I_e$ in response to an "actual current" signal below the level of the "set current" reference signal. This negative signal $-I_e$ causes the comparator 18 to produce relatively wide positive-going pulses P' (shaded in FIG. 2) because the sawtooth signal is above the level of $-I_e$ for the major portion of each cycle of the sawtooth signal. It will be recognized that the width of the pulses P will vary with any change in the level of the control signal $I_e$, regardless of whether $I_e$ is positive or negative (assuming $I_e$ remains within the amplitude of the sawtooth signal).

To control the width of the power pulses generated by the switch 12, the width-modulated pulses P from the comparator 18 are fed back to the control terminal 12c of the switch 12 via coupling means 20 and the driver 14. The coupling means 20 acts as a constant current source to establish a drive current that is independent of output load, and the driver 14 delivers proper current to control the conductivity/non-conductivity of the switch 12. The time intervals when the switch 12 is conductive correspond to the widths of the pulses P from the comparator 18, thereby controlling the width of the pulses of the switch 14 to maintain a regulated current output.

Power for the control circuitry (i.e., the differential amplifier 16, the reference voltage source 17, the sawtooth signal generator 19 and the comparator 18) is obtained from an auxiliary power supply that includes a d-c.-to-a.c. converter 21 connected to a d-c. voltage source 22, which may be a portion of the same office battery 10 that serves as the main power supply for the switch 12. D-c. voltage from the source 22 is converted to a rectangular waveform voltage across two pairs of lines 21a, 21b and 21c, 21d. The voltage across lines 21a, 21b is supplied to the sawtooth signal generator 19 which integrates the rectangular waveform to produce the desired sawtooth signal that is applied to the non-inverting input of the comparator 18. The rectangular waveform voltage on line 21a is also passed through a rectifier 23 to form a d-c. control voltage $V_{c1}$ which is supplied to the differential amplifier 16, the reference voltage source 17 and the comparator 18.

In accordance with one important aspect of the present invention, the internal d-c. voltage $V_{c1}$ is referenced to the main d-c. output from the filter 13 to produce a reference signal that varies in magnitude with any variations in the main d-c. power output, but with a substantially constant incremental increase in magnitude over that of the main d-c. output. Thus, the return line 21b from the $V_{c1}$ power supply for the control circuitry is tied to the main d-c. regulator output via line 30 so that the reference voltage supplied to the differential amplifier 16 is superimposed on the voltage pedestal created by the main d-c. regulator output voltage, floating in relationship to both terminals of the main voltage source 10. That is, the control voltage floats at the level of the regulated output of the power supply and tracks the output voltage level. This output voltage has substantially no a-c. component, and thus the control circuitry does not generate any high frequency signals that might interfere with nearby circuits. Also, the current from the control circuitry is returned to the auxiliary internal power supply $V_{c1}$ instead of being returned to the main power supply, thereby minimizing internal power losses and increasing the overall efficiency of the regulator.

In accordance with another important aspect of the present invention, the internal power supply for the driver 14 that turns the controllable switch 12 on and off during controlled time intervals is referenced to the pedestal created by the d-c. input voltage from the main power source 10. Thus, in the illustrated embodiment of FIG. 1, the d-c. drive current applied to the control input 12c of the controllable switch 12 by the driver 14 is derived from an internal power supply $V_{c2}$. This is a second independent auxiliary power supply that includes the converter 21 and a rectifier 40 in line 21c, with the return line 21d being connected to the positive terminal of the source 10. Application of the drive current to the switch 12 is controlled by the driver 14 in response to the feedback pulses from the comparator 18 to render the switch 12 repetitively conductive and non-conductive and thereby generate the desired pulses at the input to the filter 13. Since the return line 21d is connected to the power input 12a of the switch 12, the local power supply voltage $V_{c2}$ is superimposed on the d-c. input voltage from the source 10, and the drive current of the control input 12c of the switch is returned to the local internal power supply instead of the main power supply, thereby reducing internal power losses within the driver circuit and increasing the overall efficiency of the regulator. Also, the drive voltage floats with respect to the voltage levels in the control circuitry associated with the other internal supply voltage $V_{c1}$.

Because the input voltage from the source 10 provides an essentially constant voltage pedestal on which the driver voltage floats, there are no major fluctuations in the voltage levels within the driver circuit, thereby avoiding the generation of high frequency signals that might interfere with the operation of nearby circuits. The only voltage swings in the driver circuit are the relatively small changes required to effect the switching of the controllable switch 12 between its conductive and non-conductive states, and these small voltage swings are easy to shield.

Figure 3:
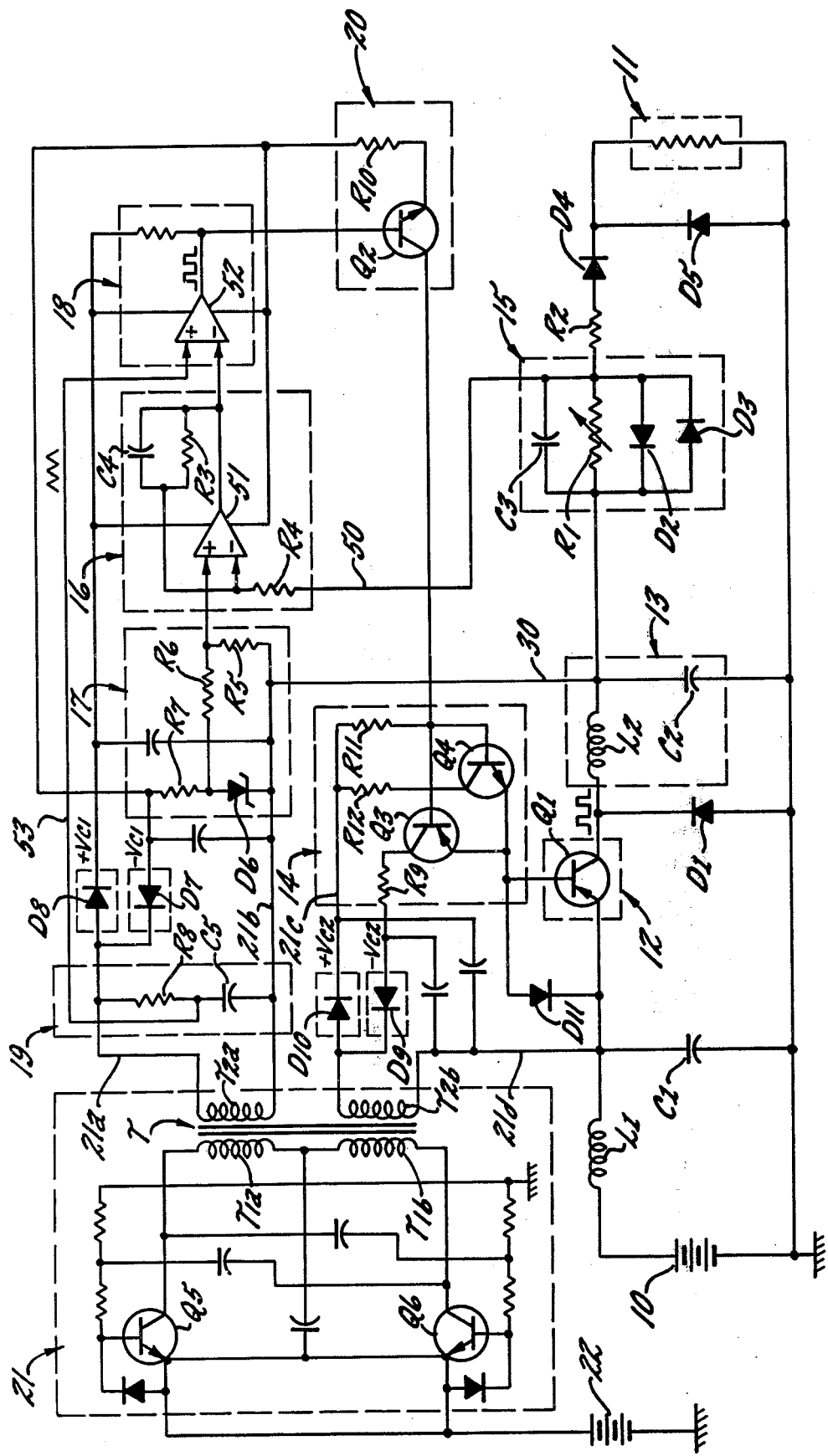
FIG. 3 is a circuit diagram of one specific embodiment of the regulator shown in FIG. 1 for supplying a regulated current output.

Turning next to FIG. 3, there is shown a detailed circuit diagram of an exemplary embodiment of the system illustrated in the block diagram of FIG. 1. The particular portions of the illustrative circuit that correspond to the blocks in FIG. 1 have been enclosed in broken-lines in FIG. 3 and identified by the same legends used in FIG. 1, and common elements in the two figures have also been identified by common reference numerals. Thus, the office battery 10 is connected to the emitter of a power transistor Q1 through a filter comprising an inductor L1 and a capacitor C1. The transistor Q1 comprises a controllable electronic switch 12 that is repetitively switched on and off to generate successive power pulses on its collector. These pulses are smoothed by a filter comprising an inductor L2 and a capacitor C2 to form a d-c. output that varies according to changes in the width of the pulses from the transistor Q1.

The switching of the transistor Q1 on and off is controlled by pulses applied to the base of the transistor, and the width of these pulses is modulated to effect corresponding modulations in the width of the power pulses generated by the transistor switch action. As described previously, this pulse width is proportional to the differential between a "set current" signal from a reference voltage source 17 and an "actual current" signal from a sensor 15. The sensor comprises a variable resistor R1 connected in series with the filter 13 and the load 11 so that the voltage drop across the resistor R1 varies in proportion to changes in the current flow to the load 11. In the particular circuit illustrated, the sensing resistor R1 is variable to permit manual adjustment of the level at which the output current is regulated, although it will be understood that this adjustment could be effected in the reference voltage source 17 rather than in the sensor 15 if desired. A small capacitor C3 is connected in parallel with the resistor R1 for improved stability, and a pair of oppositely facing diodes D2 and D3 are also connected across the resistor R1 to protect the differential amplifier 16 in the event of a short circuit.

Additional safety features in the circuit of FIG. 3 are provided by a resistor R2 in series with the resistor R1 to provide additional protection against possible short circuit, and diodes D4 and D5 which protect the power supply from excessive line voltages in the load (e.g., created by lightning).

From the sensing resistor R1, the "actual current" signal is supplied via line 50 to the inverting input of an operational amplifier 51 having resistors R3, R4 and a capacitor C4 in its feedback path. The non-inverting input of this amplifier 51 receives the "set current" reference signal from a voltage divider R5, R6 which is a part of the reference voltage source 17. A predetermined reference voltage is maintained across the divider R5, R6 by a reference diode D6 (e.g., monolithic reference diode that provides a substantially constant reference voltage and a substantially zero temperature coefficient) in series with a resistor R7 connected to the internal d-c. voltage supply—$V_{c1}$. In the event that the—$V_{c1}$ voltage varies, the shunt regulating action of the diode D6 holds a constant voltage across the divider R5, R6.

The internal voltage supply —$V_{c1}$ is derived from a diode D7 which is connected via line 21a to one end of the secondary winding T2a of a transformer T in the d-c.-to-a-c. converter 21, the diode D7 rectifying the rectangular waveform voltage developed in the winding T2a. In keeping with the invention, the lower ends of the zener diode D6 and the voltage divider R5, R6 are connected to the other end of the transformer T2a via line 21b and to the main d-c. power output from the filter 13 via the line 30. This permits the current from the reference voltage source 17 to be returned to the auxiliary internal power supply and superimposes the "set current" reference signal on the voltage pedestal created by the main d-c. power output voltage.

Whenever the differential amplifier 16 detects a change in the "actual current" signal on line 50, relative to the reference signal from the source 17, the d-c. output signal from the amplifier 51 changes in proportion to the change in the sensed current level. This "current error" signal from the amplifier 51 is applied to the inverting input of a comparator 52 which compares the "current error" signal with a sawtooth signal supplied to the non-inverting input of the comparator via line 53 from the sawtooth signal generator 19. In response to these two input signals, the comparator 52 produces output pulses whose width is modulated in accordance with the level of the output signal from the differential amplifier 16 as described above in connection with FIGS. 1 and 2.

In accordance with a further aspect of the invention, the sawtooth signal on line 53 is generated by a passive circuit that integrates the same rectangular waveform that is rectified and filtered to provide an internal d-c. voltage $V_{c1}$ to the current circuitry. Thus, in the illustrative embodiment of FIG. 3, the resistor R8 and the capacitor C5 are connected in parallel with the secondary transformer winding T2a to integrate the rectangular waveform voltage produced in that secondary winding. This integration function produces the desired sawtooth waveform at the junction between the resistor R8 and capacitor C5, and this waveform is applied directly to the non-inverting input of the comparator 52 via line 53.

The internal d-c. power supply for the operational amplifier 51, the reference voltage source D6 and the comparator 52 are derived from diodes D7 and D8, which rectify the rectangular waveform voltage in the secondary transformer winding T2a to produce an internal split supply voltage $\pm V_{c1}$. That is, the winding T2a and the diodes D7 and D8 form an auxiliary internal split power supply. As in the case of the reference voltage source 17, the current flow through the amplifier 51 and the comparator 52 is returned to the transformer winding T2a via return line 21b, and this return line is also connected via line 30 to the main d-c. power output from the filter 13. Consequently, the auxiliary internal voltage supply $\pm V_{c1}$ is referenced to the main d-c. power output.

The d-c.-to-a-c. converter 21 utilized in the illustrated system is a conventional circuit comprising a pair of transistor switches Q5 and Q6 driven 180° out of phase. That is, the transistors repeatedly connect the d-c. source 22 to the primary windings T1a and T1b of the transformer T to generate a rectangular waveform voltage in both secondary windings T2a and T2b of the transformer. As will be appreciated by those familiar with this art, the circuitry for cross-coupling the transistors Q5 and Q6 to effect the desired repetitive switching is well known and does not represent any part of the novelty of the present invention.

Returning now to the comparator 52, each time it produces an output pulse the resulting "high" voltage level at the output of the comparator turns on a transistor Q2 to draw current from the base of a main drive transistor Q3, thereby turning on Q3. As current flows through the collector-emitter circuit of the transistor Q3, it delivers base current to the transistor Q1, thereby turning on Q1. The path of the base current for Q1 is from $-V_{c2}$ through a resistor R9, the collector-emitter junction of saturated transistor Q3, and the base-emitter junction of transistor Q1, returning to the winding Tb2 via line 21d. The collector current of the transistor Q2 flows through the emitter-base junctions of the transistors Q3 and Q1, returning to $-V_{c1}$ via the collector-emitter junction of Q1, inductor L2 and line 30.

As current flows through Q2, a resistor R10 limits the current flow through the collector-emitter circuit of the transistor Q2 to a relatively constant value. This in turn limits the base current of the main drive transistor Q3 to a predetermined value.

When transistor Q2 is turned off in response to a "low" voltage level at the output of the comparator 52, the transistor Q3 is also turned off because there is no further current flow through its base to transistor Q2. This removes the base current from the transistor Q1, thereby turning off Q1.

In accordance with a further aspect of the invention, the main power switching transistor Q1 is reverse biased in its non-conductive state to reduce power losses in the transistor during switching. Thus, whenever the main drive transistor Q3 is turned off in the illustrative circuit, a transistor Q4 in the driver circuit 14 is turned on by base current drawn from $+V_{c2}$ through resistor R11. The transistor Q4 draws current from the winding T2b through the diode D10, a resistor R12, the collector-emitter circuit of the saturated transistor Q4 and a diode D11 back to the winding T2b. This current flow through the transistor Q4 establishes a reverse bias on the base of the main power switching transistor Q1, thereby providing fast switching of the transistor Q1 and lowering power losses by reducing the amount of time the transistor is in the linear region during switching. It should be noted that the main drive transistor Q3 is also reverse biased after it is turned off because the voltage on the base of this transistor is greater than the voltage of the emitter.

As described above in connection with FIG. 1, the supply voltage $\pm V_{c2}$ for the driver transistors Q3 and Q4 is referenced to the d-c. voltage supplied to the emitter of Q1 and is floating with respect to the control circuitry. Consequently, there is no large a-c. voltage swing within the drive circuit. Also, the drive current through the emitter-base junction of Q1 is returned to the auxiliary power supply $V_{c2}$ which minimizes internal power losses within the driver circuit and increases the overall efficiency of the regulator.

For improved efficiency in a system utilizing a plurality of regulated power supplies, the auxiliary split power supply $\pm V_{c2}$ associated with the drive circuit 14 can be shared with other power supplies. Thus, the lines 21c, 21d from the secondary transformer winding T2b can be connected to circuitry identical to that shown in FIG. 3 in one or more other regulators, and additional secondary windings can be provided to furnish the control voltage $\pm V_{c1}$ in these other regulators. In this manner a single d-c.-to-a-c. converter 21 can be used to service a plurality of different regulators, thereby providing a further cost reduction.

Figure 4:
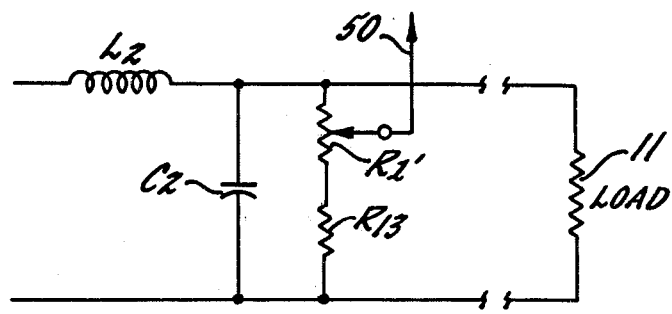
FIG. 4 is a circuit diagram of a modification of a portion of the system shown in FIG. 3 to convert the system from a current regulator to a voltage regulator.

Although the invention has been described thus far with particular emphasis on regulation of the current output of the d-c. regulator, it should be understood that the invention is equally applicable to regulation of the d-c. voltage output. Thus, as illustrated in FIG. 4, the sensing resistor R1 that is connected in series with the load in the circuit of FIG. 3 can be replaced with a sensing resistor R1' connected in parallel with the load 11. In the particular arrangement illustrated in FIG. 4, the sensing resistor R1' is variable to permit it to be adjusted for different levels of voltage regulation, and is connected in series with an attenuation resistor R13. The output signal from this voltage sensor is taken from the wiper of the variable resistor R1' and is supplied via line 50 to the inverting input of the differential amplifier 16 as an "actual voltage" signal. The operation of the remainder of the system is the same as that described above in connection with FIGS. 1-3, with the width of the output pulses generated by the switch 12 being modulated to maintain a substantially constant d-c. output voltage.

It should be understood that the term "d-c. output" as used herein and in the appended claims encompasses the voltage and/or the current output of the regulator. Moreover, this "output" need not be the voltage or current at the output terminals of the regulator, but may be the regulated level of voltage or current at any point in the power circuit downstream of the filter 13, even though this is not the precise level of voltage or current seen at the final output terminals. It should also be understood that the term "input voltage" may refer to the voltage level at any point in the power circuit between the primary source 10 and the power input 12a of the controllable switch 12.

Although the invention has been described with particular reference to the use of pulse width modulation to control the d-c. output of the regulator, it will be understood that the invention is also applicable to systems which use frequency modulation, or a combination of frequency modulation and pulse width modulation, to control the d-c. output.

As can be seen from the foregoing detailed description, this invention provides an improved switching regulator that is highly efficient while also producing a precisely regulated d-c. output. More specifically, the regulator lowers the losses of the driver for the switching transistor to a negligible value without increasing the d-c. losses in the switch, while simultaneously lowering the switching losses of the transistor switch by increasing its speed. Moreover, power losses in the internal control circuitry are minimized while maintaining internal voltage levels that do not vary any more than the d-c. input voltage of the regulator, thereby providing a highly efficient regulator that does not generate high frequency signals that might interfere with other circuits located nearby. This regulator is also substantially insensitive to temperature changes, thereby ensuring stability in the regulated d-c. output. Finally, the regulator provided by this invention is economical to both manufacture and operate without maintenance.

I claim as my invention:

1. In a switching regulator for generating controllable pulses from a primary d-c. voltage source and then smoothing said pulses to form a d-c. output that varies according to the changes in said pulses, the improvement comprising a reference voltage source for establishing a d-c. reference signal that varies in magnitude with any variations in the magnitude of the d-c. output but with a substantially constant differential in magnitude between the reference signal and the d-c. output, sensing means for generating a signal that varies in accordance with changes in the voltage or current level of the d-c. output, control means for detecting the difference between said reference signal and the signal from said sensing means and producing a control signal that varies in accordance with changes in said difference, and means responsive to said control signal for adjusting the pulses that are generated and smoothed to form said d-c. output so as to maintain said output at a regulated voltage or current level, said reference voltage source and said control means including an auxiliary internal power supply and means for returning the current flow through said reference voltage source and control means to said auxiliary internal power supply to minimize power losses in said reference voltage source and control means.

2. A switching regulator as set forth in claim 1 which includes means for establishing a predetermined d-c. drive voltage superimposed on the d-c. voltage from said primary source and floating with respect to said reference signal and said d-c. output.

3. A pulse width modulated switching regulator for a variable load, said regulator comprising a primary d-c. voltage source, controllable electronic switching means connected to the primary voltage source for transmitting successive pulses of power from said source, filtering means connected to said switching means for smoothing said pulses to form a d-c. output for the load, and pulse width modulated drive means for controlling said switching means to vary the width of said power pulses in accordance with changes in said d-c. output to produce a regulated output, said pulse width modulated drive means including an auxiliary d-c. voltage source connected to said primary source for referencing the auxiliary source to said primary voltage so that the voltage levels in said drive means float on said primary voltage with the current supplied to said drive means being returned to said auxiliary source to minimize power losses in said drive means.

4. In a switching regulator including controllable electronic switching means for generating controllable pulses from a primary d-c. voltage source and means for smoothing said pulses to form a d-c. output that varies according to changes in said pulses, the improvement comprising drive means for establishing a predetermined d-c. drive voltage superimposed on the d-c. voltage from said source for rendering said controllable electronic switching means conductive during controlled time intervals to generate said controllable pulses, control means for generating control signals representing any deviations of the d-c. output from a predetermined level, said drive means including means responsive to said control signals for adjusting said controlled time intervals and the corresponding pulses that are generated and smoothed to form said d-c. output so as to maintain said output at said predetermined level.

5. A switching regulator as set forth in claim 4 wherein said drive means includes an auxiliary internal power supply and means for returning the current flow through said drive means to said auxiliary power supply to minimize power losses in said drive means.

6. A switching regulator as set forth in claim 5 wherein said conrol means includes a second auxiliary internal power supply and means for returning the current flow through said control means to said second auxiliary internal power supply to minimize power losses in said control means.

7. A switching regulator as set forth in claim 4 which includes means for establishing a d-c. reference signal that varies in magnitude with any variations in the magnitude of the d-c. output but with a substantially constant differential in magnitude between the reference signal and the d-c. output, said reference signal floating with respect to the voltage from said primary source.

8. A switching regulator as set forth in claim 4 which includes means for reverse biasing the control input of said controllable switching means to reduce power losses during switching between the conductive and non-conductive states.

9. In a switching regulator for producing a regulated d-c. output from a d-c. input source, the regulator including a switching transistor having its load terminals interposed between the source and output and drive means for controlling the conduction of the switching transistor, the improvement comprising an independent auxiliary power supply for powering the drive means, and means referencing the auxiliary power supply to said d-c. input source so that drive current supplied to the switching transistor is returned to the auxiliary power supply to minimize losses in said drive means.

10. A switching regulator as set forth in claim 9 wherein the output voltage of said auxiliary power supply is substantially less than the voltage of said d-c. input source.

11. A switching regulator as set forth in claim 9 wherein said auxiliary power supply is split, said drive means is coupled to said split auxiliary source and includes means for supplying base current to said switching transistor to cause said transistor to conduct, and means for reverse biasing the control terminals of said switching transistor to rapidly switch said transistor off, thereby to reduce the amount of time said transistor is in the linear region during switching.

12. A switching regulator as set forth in claim 9 which includes a control circuit having means for establishing a reference voltage, means for producing a sensed voltage indicative of the magnitude of the regulated output, and means for comparing the reference and sensed voltages to produce a control signal, means responsive to said control signal for controlling said drive means, thereby to control the regulated output, a second independent auxiliary power supply for powering said control circuit, and means referencing said second auxiliary power supply to said regulated output, whereby the control circuit floats at the level of said regulated output to minimize power dissipation in said control circuit.

13. In a switching regulator for producing a regulated d-c. output from a d-c. input source, the regulator including a switching transistor and a filter with the transistor having its power terminals interposed between the source and the filter, and drive means for controlling the conduction of the switching transistor, the improvement comprising
a control circuit having means for establishing a reference voltage, means for producing a sensed voltage indicative of the magnitude of the regulated output, and means for comparing the reference and sensed voltages to produce a control signal, means responsive to said control signal for controlling said drive means, thereby to control the regulated output, an auxiliary power supply for powering said control circuit and for returning the current flow through said control circuit to said auxiliary power supply to minimize power losses in said control circuit, and means referencing said auxiliary power supply to said regulated output, whereby the control circuit floats at the level of said regulated output to minimize power dissipation in said control unit.

14. A switching regulator as set forth in claim 13 which includes a second independent auxiliary power supply for powering the drive means, and means referencing said second auxiliary power supply to said d-c. input source so that drive current supplied to the switching transistor is returned to said second auxiliary power to supply to minimize losses in said drive means.

15. A pulse width modulated switching regulator for a variable load, said regulator comprising
a primary d-c. voltage source,
controllable electronic switching means connected to the primary voltage source for transmitting successive pulses of power from said source.
filtering means connected to said switching means for smoothing said pulses to form a d-c. output for the load,
and pulse width modulating means for controlling said switching means to vary the width of said pulses in accordance with changes in said d-c. output to produce a regulted output,
said pulse width modulating means including an auxiliary d-c. voltage source connected to the output of said filtering means for referencing the auxiliary source to the main d-c. output so that the voltage levels in said pulse width modulating means float on the d-c. output with the current supplied to said modulating means being returned to said auxiliary source to minimize power losses in said modulating means.

* * * * *